United States Patent [19]

Grovom

[11] Patent Number: 5,354,090

[45] Date of Patent: Oct. 11, 1994

[54] COLLAPSIBLE PORTABLE TRAILER FOR ALL TERRAIN VEHICLES

[76] Inventor: Douglas Grovom, Rt. 1 Box 116, Lenore, Id. 83541

[21] Appl. No.: 147,308

[22] Filed: Nov. 5, 1993

[51] Int. Cl.$^5$ .............................................. B62D 21/14
[52] U.S. Cl. .................... 280/656; 280/638; 296/26
[58] Field of Search ................ 280/638, 656, 789, 42; 296/26, 182, 204

[56] References Cited

U.S. PATENT DOCUMENTS

| | | | |
|---|---|---|---|
| 2,738,200 | 3/1956 | De Haven | 280/656 |
| 3,885,691 | 5/1975 | Knapp | 280/656 |
| 5,249,823 | 10/1993 | McCoy et al. | 280/656 |

Primary Examiner—Mitchell J. Hill
Attorney, Agent, or Firm—Paul F. Horton

[57] ABSTRACT

A trailer having a fixed framework and a telescoping framework engaging the fixed framework for shortening or lengthening of the trailer; a flexible floor foldable for use in either mode; a hitch assembly which permits ninety degree upwardly pivot of the trailer, when in the shortened mode for non-ground support portability on the towing vehicle; and a support bar engaging the towing vehicle for holding the trailer in the supported, portable position. A substantially V-shaped housing on the trailer provides a storage container with low center of gravity and also provides an axle housing for the trailer wheels.

19 Claims, 2 Drawing Sheets

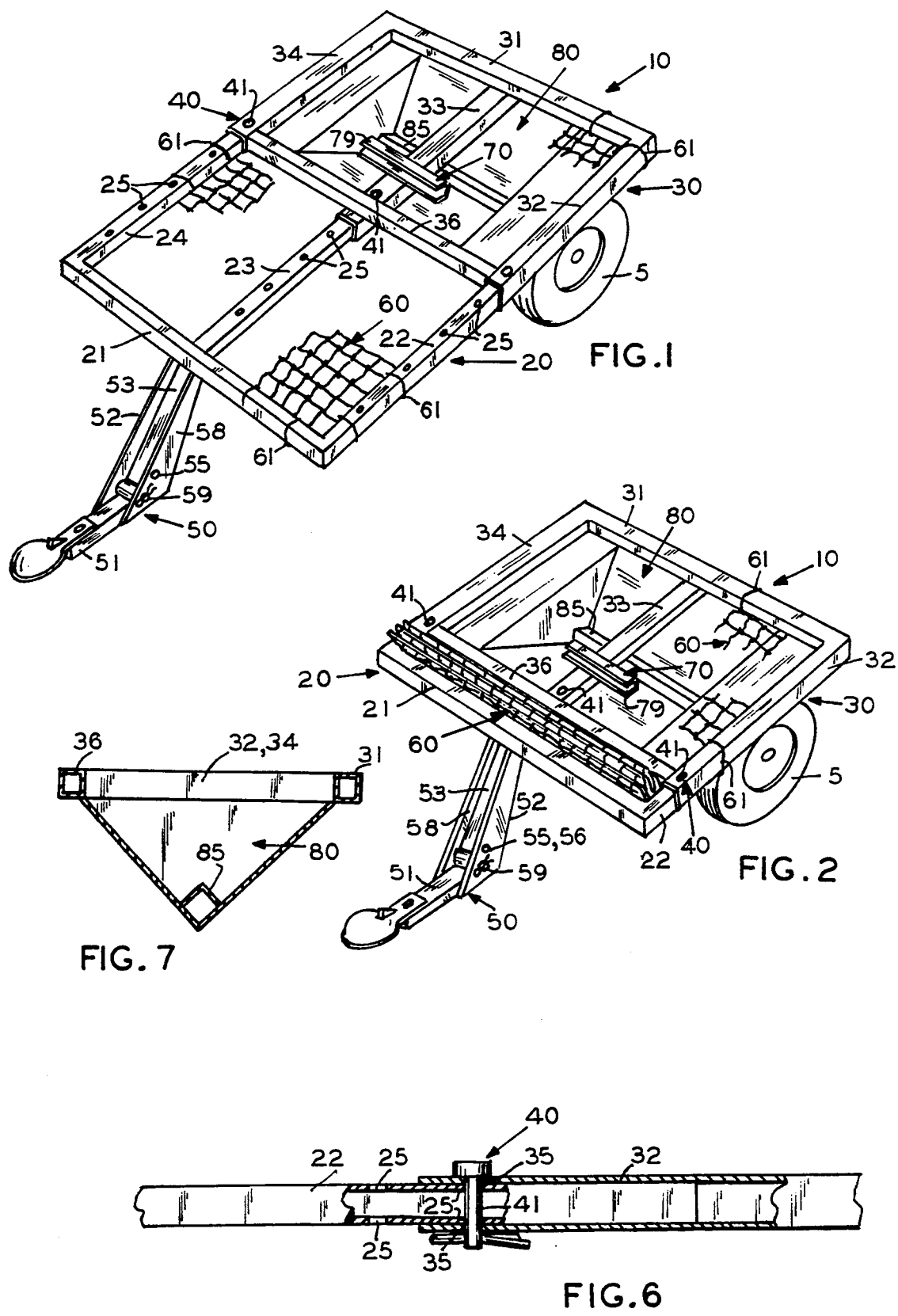

1

COLLAPSIBLE PORTABLE TRAILER FOR ALL TERRAIN VEHICLES

BACKGROUND OF THE INVENTION

1. Field of the Invention

This invention relates, in general, to trailers, and, in particular, to trailers which may be lengthened or shortened for varying carrying capacity and which may be supported by a towing vehicle in a suspended, above-ground mode when desired.

2. Description of the Prior Art

When towing a small trailer, especially with an all terrain vehicle, ATV, as the towing vehicle, at times it is desirable to have maximum surface area on the trailer for carrying large objects or an increased number of small objects. At other times, because of the type of terrain, it is most desirable, and may be essential, that the trailer be of shorter length for, among other reasons, shortening the turning radius of towing vehicle and trailer. At other times, again because of rough terrain including bushes, sand, rocks, streams, etc., it is found desirable and also may be required that the trailer be carried by rather than pulled by the towing vehicle so that the trailer may be used in the otherwise inaccessible area.

Several devices have been constructed for collapsing and hauling trailers as typified by the following inventions.

U.S. Pat. No. 3,367,675, issued to D. Gearin, discloses a trailer having collapsible tong assemblies on both the bottom and sides of the trailer for lengthening or shortening the trailer. Gearin utilizes rigid elongated side members for holding the folding mechanism in a fixed position—one set of side members for holding the trailer in a lengthened mode and a second set of side members for holding the trailer in a shortened mode. Gearin utilizes hinged panels or a window shade type structure of thin stainless steel for flooring. The Gearin trailer is costly; bulky, with an extreme number of moving parts; provides a complicated flooring mechanism; cannot be supported by a towing vehicle, when hitched; and is generally impractical.

U.S. Pat. No. 3,403,924, issued to J. Oliveira, discloses a laterally collapsible trailer with the tongue portion slidably receiving a central shaft for shortening or lengthening the distance between hitch and trailer frame; the surface area of the trailer being unchanged. The Oliveira device is collapsible for storage only.

U.S. Pat. No. 3,368,827, issued to S. Dashew shows a trailer with a portion hinged about a horizontal axis, which effectively shortens the trailer. The Dashew invention, while useful for its intended purpose, does not vary the surface area, but merely pivots a portion thereof; does not change the turning radius and cannot be supported in an above ground position, while hitched, by the towing vehicle.

U.S. Pat. No. 3,877,714, issued to J. Black shows a trailer attachment for a pickup which pivots from a trailing position to a flat position resting on the bed of the pickup. The Black invention is useful only on towing vehicles having a flat bed for support and has no capability of being lengthened or shortened.

SUMMARY OF THE INVENTION

The present invention overcomes the problems of the prior art by providing a trailer which may be quickly and easily lengthened or shortened to increase carrying capacity by means of telescoping frameworks; by providing a flexible mesh floor which folds or unfolds to cover the desired surface area, with a minimum of bulk; and by providing a hitch assembly which, in combination with latch means, allows the trailer, in its shortened mode, to be vertically pivoted, while hitched, ninety degrees to an off-ground position for portability. The present invention also provides a trailer which is cost efficient with a minimum of bulk and moving parts. Additional objects and advantages will become apparent and a more thorough and comprehensive understanding may be had from the following description taken in conjunction with the accompanying drawings forming a part of this specification.

BRIEF DESCRIPTION OF THE DRAWINGS

FIG. 1 is a plan perspective view of the trailer of the present invention in its lengthened mode.

FIG. 2 is a plan perspective view of the trailer of FIG. 1 shown in its shortened mode.

FIG. 6 is a side view, in section, of telescoping rails with latch pin of the present invention.

FIG. 7 is a side sectional view of the container and axle housing of the present invention.

DETAILED DESCRIPTION OF THE INVENTION

Figure 3:
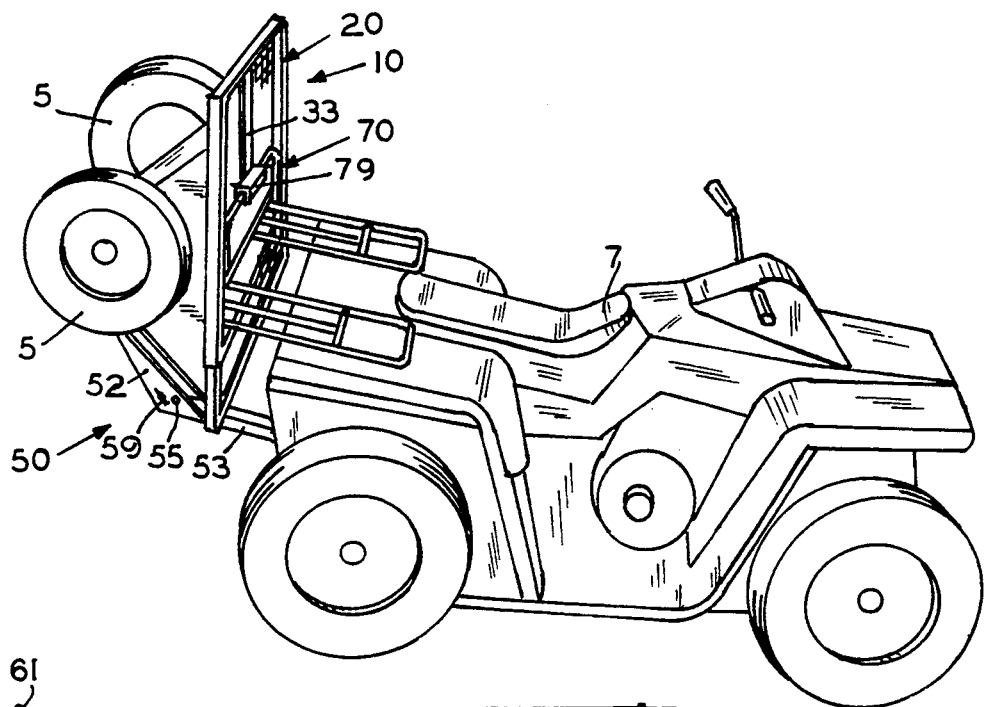
FIG. 3 is a side view of the trailer in its above-ground position as carried by an ATV.

Referring now to the drawings and to FIG. 1, in particular, an embodiment to be preferred of a trailer 10, made according to the present invention is disclosed. Trailer 10 includes, generally, a fixed framework 20; a telescoping framework 30; latch means 40 for holding the telescoping framework in fixed position to the fixed framework; one or more wheels 5, rotatably supporting the trailer; a hitch assembly 50 for connecting the trailer to a tow vehicle and for ninety degree vertical pivoting of the trailer about a horizontal axis for an above-ground position for carrying by a tow vehicle; a flexible floor 60 for accommodating varying lengths of the trailer; and second latch means 70 for holding the trailer in its suspended off-ground position to the towing vehicle.

Fixed framework 20 is substantially rectangular in shape and includes a laterally oriented front rail 21 to which are affixed, by welding or otherwise, a pair of laterally spaced, parallel, and rearwardly extending side rails 22 and 24 and a center rail 23. Each of the rails are constructed of tubular steel and include selectively spaced pin holes 25 for latching purposes, as will hereinafter be explained. The fixed framework may also be provided with a back rail.

Telescoping framework 30 also is provided with a rectangular frame having a laterally extending back rail 31 to which are affixed a pair of laterally spaced, parallel, and forwardly extending side rails 32 and 34 and a center rail 33; the rails being in alignment, i.e., registry, with respective rails of the fixed framework 20. For stability, telescoping framework 30 also includes a front rail 36 to which the side rails and center rail are secured. Side rails 32 and 34 and center rail 33 are constructed of tubular steel having an inside diameter slightly greater than the outside diameter of respective rails 22, 24, and 23 for telescopically receiving said rails of the fixed framework for lengthening or shortening of trailer 10.

Rotatably mounted to telescoping framework 30 are one or more wheels 5; two laterally spaced wheels being shown. For increasing carrying capacity of the trailer, while also providing axle support for wheels 5, telescoping framework 30 is provided with a deep storage container 80, V-shaped in cross section, as shown in FIG. 7, for providing a low center of gravity to promote stability of the trailer as well as increasing carrying capacity significantly. At its lowermost end, the container 80 is provided with an axle housing 85 for placement of an axle, not shown, for supporting wheels 5.

Latch means 40, shown to advantage in FIGS. 1, 2, and 6, hold telescoping framework 30 in an extended or shortened mode with fixed framework 20. Latch means 40 preferably comprises one or more pin holes 25 located in rails 22, 23, and 24 of the fixed framework and pin holes 35 located in respective rails 32, 33, and 34 of the telescoping framework; the pin holes 25 and 35 being in alignment for insertion of latch pins 41.

In increasing the trailer length, as shown in FIG. 1, or in decreasing the trailer length, as shown in FIG. 2, it is obvious that the framework area of the trailer, defined by the rectangles, is increased or decreased. For utilizing this area, a flexible floor 60 is provided. Floor 60 is constructed preferably of a fabric mesh which is held to the side rails of both fixed framework 20 and telescoping framework 30 by means of tie members 61, which encircle the side rails, for maintaining the floor in a suitably taut position laterally, while slipping along the length of side rails 22 and 24 of the fixed framework to fold as the trailer is adjusted from the lengthened mode to the shortened mode. It has been found the nylon mesh expedites folding while providing sufficient strength and a minimum of bulk. Tie members 61 also hold the floor to front rail 21 for maximum tautness both width-wise and length-wise during full extension of the trailer.

Figure 4:
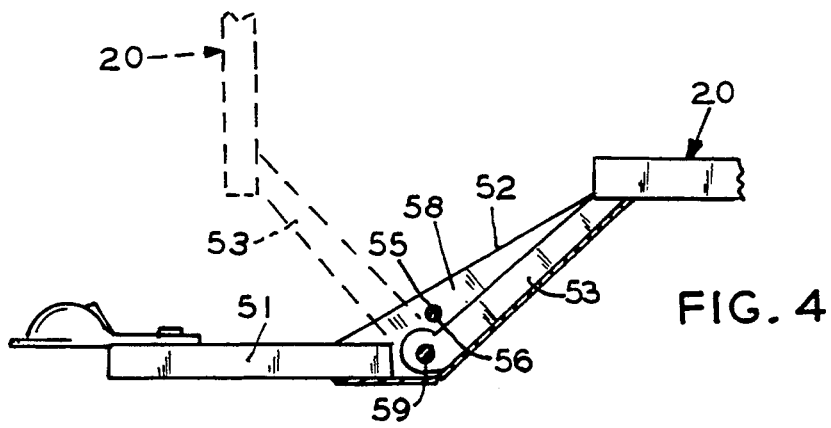
FIG. 4 is a side view, in partial section, of the hitch assembly of the present invention.

Referring now to FIGS. 3 and 4, taken together with FIGS. 1 and 2, hitch assembly 50 may be seen to advantage. Hitch assembly 50 permits trailer 10, in its shortened mode, as shown in FIG. 2, to be pivoted vertically upward, about a horizontal axis, ninety degrees to normal, while still being hitched to the towing vehicle, ATV 7, to be carried by the ATV in an above-ground position, as shown in FIG. 3. The hitch assembly preferably includes a tow bar 51 for connecting the trailer to the towing vehicle; a channel member 52 having vertically spaced side members 58; a trailer connector bar 53 pivotally connected to channel member 52 by means of a pivot pin 59 and also affixed to fixed framework 20, adjacent the joinder of front rail 21 and center rail 23; and a lock pin 55 insertable through aligned apertures 56, only one being shown, in the channel member for holding trailer connector bar 53 in a fixed position relative to channel member 52. Channel member 52, by means of side members 58, in cooperation with the horizontal pivot pin 59 provides a guide to the trailer connector bar 53, preventing lateral movement of connector bar 53 as it pivots the trailer from a horizontal position to a vertical position, shown by dotted lines in FIG. 4.

Figure 5:
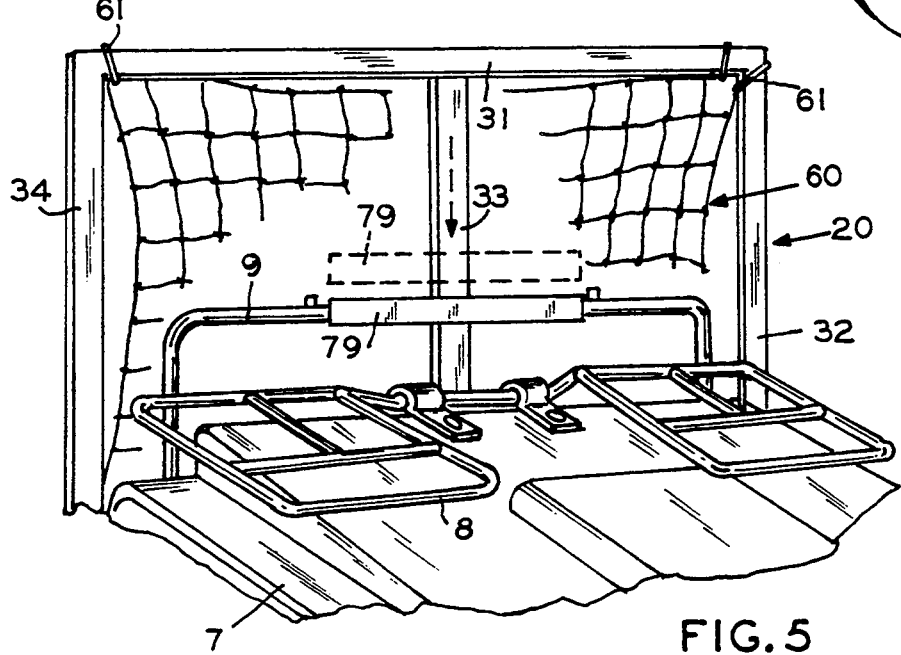
FIG. 5 is a side perspective view of a latch connecting the trailer in its above-ground position to a support rack of the ATV.

Once pivoted, trailer 10 is secured in the vertical above-ground engaging mode, shown in FIG. 3, by second latch means, designated generally by the numeral 70. See FIGS. 3 and 5. Second latch means 70 secures the trailer to a horizontal support bar 9; the support bar 9, in the example shown, being the top bar of a rack 8 mounted on ATV 7. Latch means 70 includes, preferably, a channel member 79, reversed U-shape in construction, which is adjustably mounted laterally on center rail 33 of telescoping framework 30. Channel member 79 simply slides over and receives support bar 9 of rack 8, the trailer being held in the suspended position by gravity.

Trailer 10 may be provided with utility boxes or dump boxes or any other box to the liking of the operator, said variety of boxes not being shown. Such boxes may be secured to the frameworks by readily removable bolts or pins in either the shortened or lengthened mode.

Having thus described in detail a preferred embodiment of the present invention, it is to be appreciated and will be apparent to those skilled in the art that many physical changes could be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A collapsible portable trailer for a tow vehicle, said trailer comprising:
   a fixed framework, substantially rectangular in configuration, having a laterally disposed front rail and two laterally and parallel spaced side rails affixed to and rearwardly extending from said front rail;
   a telescoping framework, also substantially rectangular in configuration, having a laterally disposed back rail and two laterally and parallel spaced side rails, each of said side rails in registry with and telescopically engageable with a respective side rail of said fixed framework for varying the length and hence the surface area of said trailer;
   latch means for holding said side rails of said fixed framework and respective side rails of said telescoping framework in fixed relationship with one another;
   a pair of laterally spaced wheels rotatably mounted to said telescoping framework;
   a hitch assembly for connecting said trailer to said tow vehicle; and
   a floor constructed of flexible fabric for folding and unfolding upon shortening and lengthening, respectively, of said trailer.

2. The trailer as described in claim 1 wherein said hitch assembly is provided with pivot means for vertically pivoting said trailer ninety degrees upward from normal for carrying said trailer in an above-ground engaging mode on said tow vehicle.

3. The trailer as described in claim 1 further comprising second latch means for holding said trailer in said above-ground engaging mode to said tow vehicle.

4. The trailer as described in claim 3 wherein said second latch means includes a horizontal support bar mounted on said tow vehicle and a support bar engagement member mounted on said telescoping framework.

5. The trailer as described in claim 4 wherein said support bar engagement member includes a channel member operable to receive said support bar of said tow vehicle for holding and maintaining said trailer in said above-ground engaging mode.

6. The trailer as described in claim 1 wherein said telescoping framework defines a downwardly depending, substantially V-shaped container and wherein said container includes a horizontally oriented axle housing for holding an axle for supporting said wheels.

7. The trailer as described in claim 1 wherein said hitch assembly includes a tow bar with connection means to said tow vehicle; a channel member affixed to said tow bar; a trailer connector bar held within and pivotally engaging said channel member about a horizontal axis; and a lock pin extending through aligned apertures in said channel member for holding said trailer connector bar in a fixed position relative to said channel member.

8. A collapsible portable trailer for a tow vehicle, said trailer comprising:
   a fixed framework, substantially rectangular in configuration, having a laterally disposed front rail and two laterally and parallel spaced side rails affixed to and rearwardly extending from said front rail;
   a telescoping framework, also substantially rectangular in configuration, having a laterally disposed back rail and two laterally and parallel spaced side rails, each of said side rails in registry with and telescopically engageable with a respective side rail of said fixed framework for varying the length and hence the surface area of said trailer;
   latch means for holding said side rails of said fixed framework and respective side rails of said telescoping framework in fixed relationship with one another;
   at least one wheel rotatably mounted to said telescoping framework;
   a hitch assembly for connecting said trailer to said tow vehicle, said hitch assembly provided with pivot means for vertically pivoting said trailer ninety degrees upward from normal for carrying said trailer in an above-ground engaging mode on said tow vehicle; and
   second latch means for holding said trailer in said above-ground engaging mode to said tow vehicle.

9. The trailer as described in claim 8 further comprising a floor constructed of flexible fabric for folding and unfolding upon shortening and lengthening, respectively, of said trailer.

10. The trailer as described in claim 8 wherein said fixed framework further comprises a center rail rearwardly extending from said front rail and wherein said telescoping framework further comprises a center rail in registry with and telescopically engageable with said center rail of said fixed framework.

11. The trailer as described in claim 8 wherein said telescoping framework defines a downwardly depending, substantially V-shaped container.

12. The trailer as described in claim 11 wherein said container includes a horizontally oriented axle housing for holding an axle for supporting at least one wheel.

13. The trailer as described in claim 8 wherein said hitch assembly includes a tow bar with connection means to said tow vehicle; a channel member affixed to said tow bar; a trailer connector bar held within and pivotally engaging said channel member about a horizontal axis; and a lock pin extending through aligned apertures in said channel member for holding said trailer connector bar in a fixed position relative to said channel member.

14. The trailer as described in claim 8 wherein said second latch means includes a horizontal support bar mounted on said tow vehicle and a support bar engagement member mounted on said telescoping framework.

15. The trailer as described in claim 14 wherein said support bar engagement member includes a channel member operable to receive said support bar of said tow vehicle for holding and maintaining said trailer in said above-ground engaging mode.

16. A collapsible portable trailer for a tow vehicle, said trailer comprising:
   a fixed framework, substantially rectangular in configuration, having a laterally disposed front rail and two laterally and parallel spaced side rails affixed to and rearwardly extending from said front rail;
   a telescoping framework, also substantially rectangular in configuration, having a laterally disposed back rail and two laterally and parallel spaced side rails, each of said side rails in registry with and telescopically engageable with a respective side rail of said fixed framework for varying the length of said trailer;
   latch means for holding said side rails of said fixed framework and respective side rails of said telescoping framework in fixed relationship with one another;
   at least one wheel rotatably mounted to said telescoping framework;
   a hitch assembly for connecting said trailer to said tow vehicle, said hitch assembly provided with pivot means for vertically pivoting said trailer ninety degrees upward from normal for carrying said trailer in an above-ground engaging mode on said tow vehicle; and
   second latch means for holding said trailer in said above-ground engaging mode to said tow vehicle, said second latch means including a horizontal support bar mounted on said tow vehicle and a support bar engagement member mounted on said telescoping framework, said support bar engagement member including a channel member operable to receive said support bar of said tow vehicle for holding and maintaining said trailer in said above-ground engaging mode; and
   a floor constructed of flexible fabric for folding and unfolding upon shortening and lengthening of said trailer.

17. The trailer as described in claim 16 wherein said hitch assembly includes a tow bar with connection means to said tow vehicle; a channel member affixed to said tow bar; a trailer connector bar held within and pivotally engaging said channel member about a horizontal axis; and a lock pin extending through aligned apertures in said channel member for holding said trailer connector bar in a fixed position relative to said channel member.

18. The trailer as described in claim 16 wherein said telescoping framework defines a downwardly depending, substantially V-shaped container and wherein said container includes a horizontally oriented axle housing for holding an axle for supporting each of said wheels.

19. The trailer as described in claim 16 wherein said floor is constructed of mesh fabric.

* * * * *